United States Patent [19]
Torok

[11] 3,743,906
[45] July 3, 1973

[54] DRIVING SYSTEM COMPRISING A RELUCTANCE MOTOR HAVING BOTH POSITION AND SPEED FEEDBACK

[75] Inventor: Vilmos Torok, Vasteras, Sweden

[73] Assignee: Allmanna Svenska Elektriska Aktiebolaget, Vasteras, Sweden

[22] Filed: Nov. 25, 1970

[21] Appl. No.: 92,729

[30] Foreign Application Priority Data
Nov. 26, 1969 Sweden............................ 16232/69

[52] U.S. Cl.................. 318/254, 318/327, 318/231
[51] Int. Cl. ........................................... H02k 29/00
[58] Field of Search................... 318/138, 254, 327, 318/231, 439

[56] References Cited
UNITED STATES PATENTS

| | | | |
|---|---|---|---|
| 3,127,548 | 3/1964 | Van Emden......................... | 318/696 |
| 3,271,649 | 9/1966 | Juergensen ..................... | 318/138 X |
| 3,612,973 | 10/1971 | Kuniyoshi........................... | 318/254 |
| 3,512,067 | 5/1970 | Landau........................... | 318/231 X |
| 3,418,550 | 12/1968 | Kolatorowicz et al.......... | 318/254 X |
| 3,440,506 | 4/1969 | Krestel et al.................... | 318/254 X |
| 3,529,220 | 9/1970 | Kobayahi et al................ | 318/254 X |
| 3,577,049 | 5/1971 | Madurski............................ | 318/254 |
| 3,593,083 | 7/1971 | Blaschke............................ | 318/231 |
| 3,500,158 | 3/1970 | Landau et al....................... | 318/227 |

*Primary Examiner*—G. R. Simmons
*Attorney*—Jennings Bailey, Jr.

[57] ABSTRACT

A reluctance motor has a stator with a plurality of stator pole bodies arranged circumferentially one after the other and supporting a body and a rotor with a plurality of rotor poles arranged circumferentially one after the other, so that a given turning movement of the rotor causes the permeance between a stator pole and a rotor pole to increase from a minimum value to a maximum value upon half the movement, and then to decrease progressively to the minimum value. The winding is connected to a current source, the voltage of which during motor operation is synchronized in such a way that the average value of the current flowing through the winding while the permeance is increasing is greater than while it is decreasing.

The current source is a controlled semiconductor converter connected between a network and a winding and which forms a part of a controlled circuit and delivers a direct current. A current comparison device which controls the converter compares the difference between the current flow through the converter and a varying reference value. This varying reference value is furnished by the combination of a constant reference value and a second reference value, the supply of which is controlled by a switching device operating synchronously with the rotation of the motor. The reference value supplied to the switching device is a combination of a predetermined reference value and a value dependent on the speed of rotation. A phase-advancing circuit is provided to advance the operation of the switch means proportionately to the speed of rotation.

2 Claims, 18 Drawing Figures

Patented July 3, 1973

INVENTOR.
BY VILMOS TÖRÖK

INVENTOR.
BY VILMOS TÖRÖK
Jennings Bailey, Jr

INVENTOR.
BY VILMOS TÖRÖK

INVENTOR.
BY VILMOS TÖRÖK

Patented July 3, 1973

INVENTOR.
VILMOS TOROK
BY
Jennings Bailey Jr

DRIVING SYSTEM COMPRISING A RELUCTANCE MOTOR HAVING BOTH POSITION AND SPEED FEEDBACK

BACKGROUND OF THE INVENTION

1. Field of the Invention

The present invention relates to a driving system comprising a reluctance motor, the stator of which has a number of stator pole bodies arranged tangentially one after the other and supporting a winding, and the rotor of which has a plurality of rotor poles arranged tangentially one after the other, wherein a certain turning movement of the rotor causes the permeance between a stator pole and a rotor pole to increase from a minimum value to a maximum value upon half the movement, and then to decrease progressively to said minimum value, said winding being connected to a current source, the voltage of which during motor operation is synchronized with the rotor movement in such a way that the average value of the current flowing through the winding while the permeance is increasing is greater than while it is decreasing.

2. The Prior Art

Such driving systems are known (for example through German published specification No. 1,102,262) in embodiments intended for purposes requiring little power. The synchronized current source then consists of a direct current source in series with a circuit breaker driven by the rotor movement. The contacts of the circuit breaker are separated during intervals when said permeance is decreasing so that the current through the winding is broken, or at least reduced. A necessary condition for motor operation to be obtained in a reluctance motor is that the magnetic flux through the poles during said intervals of decreasing permeance is reduced. In the devices described above this is done by consuming a considerable part of the magnetic energy stored in the pole system at maximum flux in the form of arc effect in the circuit breaker. This means that the driving system is very inefficient and its usefulness is therefore very limited. Furthermore, a reliable breaker operating in the manner described above can hardly be manufactured at reasonable cost if the motor power is more than 0.5 kW.

Attempts have also been made to develop a reluctance machine for relatively high power. Such a machine is described in the British Pat. No. 1,099,010, that is, a reluctance machine intended to be driven as a synchronous machine. The machine requires no switching means. It is provided with an operating winding, intended to be connected directly to an alternating current network, and also with a direct current winding. The necessary difference between the magnetic attraction at increasing and decreasing permeance is obtained by adding the AC flux and the DC flux in the air gap. The flux paths must therefore be arranged in such a way that the AC flux is not surrounded by the DC winding, thus making the design of the machine complicated and expensive. However, the poles have the alternating flux and the flux generated by the DC winding flowing through them, which means that the amount of material used per power unit is greater than with conventional machines.

The machine is provided with a special magnetic layer on the rotor or stator pole faces, and this magnetic layer has a saturation flux density which is substantially lower than that of other parts of the magnetic flux circuit. In this way the pole flux is made dependent on the overlapping between stator and rotor pole faces, and strongly responsive to a changed degree of overlapping even when the overlapping is rather great, for example more than half its maximum value.

With relatively large machines made with a high degree of utilization as regards magnetic material, the value of the pole flux increase which occurs upon a certain increase of the degree of pole overlapping can be practically constant in a range of overlapping corresponding to a dominating part of the tangential extension of a pole, provided the pole, in accordance with conventional reluctance motor design principles, is constructed without any increase of the pole section near the pole face.

SUMMARY OF THE INVENTION

A driving system according to the invention is intended to include a reluctance motor which, even when dimensioned for high power, can be made with substantially the same simple design as most of the conventional reluctance motors, the expensive and complicated structure of the machine described above being avoided.

BRIEF DESCRIPTION OF THE DRAWINGS

In the drawings:

FIG. 9A shows the same when the feeding network is a three-phase one;

Hitherto no driving system has been developed which in any way alters the conception expressed in known textbooks and manuals, namely that in view of its low efficiency and utilization of material the reluctance motor is not suitable for driving systems having relatively high power.

Since the arrival of semiconductor rectifiers for strong current on the market, a considerable number of advanced driving systems have been developed, for example systems with continuous speed control and regenerative braking, which are based on the combination of controlled semiconductor rectifiers and rotating electric machines. Since the rectifier equipment in such systems is a considerable portion of the costs, it is naturally desirable to utilize it to the fullest extent and the rotating machine cooperating with the rectifiers must therefore be one of high efficiency. It is then easy to understand that the reluctance motor has therefore hardly seemed to the experts to be an attractive alternative in the choice of the type of machine for a rectifier-controlled driving system when this is to be dimensioned for relatively high power, for example a power greater than 0.5 kW.

Figure 1:
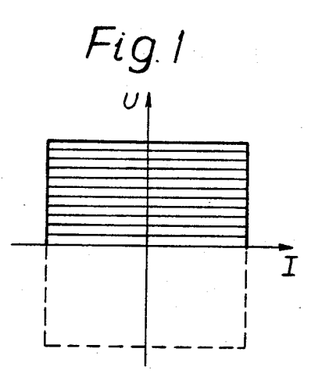
FIG. 1 shows the demand for regulating current and voltage in a DC motor.
Figure 2:
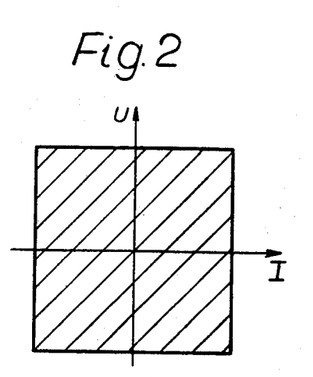
FIG. 2 shows the demand for regulating a synchronous and an asynchronous motor.
Figure 3:
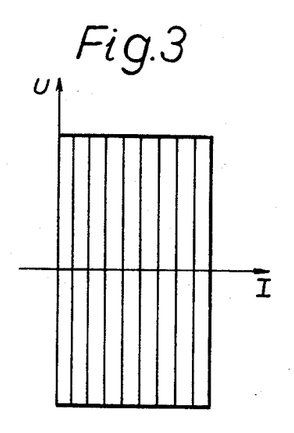
FIG. 3 shows the demand for regulating a DC reluctance motor.

The knowledge upon which the present application for patent is based has been acquired by the inventor through a systematic analysis carried out in order to obtain a diagrammatic survey concerning the variety of current and/or voltage directions needed for different modes of operation for different types of motors. FIGS. 1, 2 and 3 of the accompanying drawings give graphic illustrations for DC, synchronous or asynchronous motors, and for a reluctance motor, respectively, U designating voltage and I current. It is seen that a synchronous or asynchronous motor requires both current and voltage suppliable in two different directions and that the current in a DC motor must be reversible if regenerative braking is to be possible. As indicated by dotted lines in FIG. 1, in the latter cases even the supplied voltage must be reversible if the motor is to be able to reverse. A reluctance motor operates as a motor during the above-mentioned permeance increase and can operate as generator in the interval when permeance decrease is taking place. The current direction in the winding is then unchanged upon a transfer from permeance increase to permeance decrease since during permeance decrease a voltage is induced in the winding which tends to maintain the flux. If, during permeance decrease, the current source connected to the winding is operating with reversed voltage direction, this will mean that the reluctance motor returns power to the current source during the permeance decreasing interval. Regenerative braking can be achieved by varying the absolute value of the imposed voltage in such a way that the power fed back is greater than that supplied to the motor in a subsequent interval. The direction of rotation of the motor is independent of the direction of the current and voltage delivered by the current source.

Thus, with a reluctance machine, all types of operation can be obtained with the same current direction in the winding, as indicated in FIG. 3.

If a controlled current rectifier is connected to a current source which delivers current through the current converter to a load, the current in the load circuit can only have one direction and it can continue to flow even when the voltage of the current source alters direction, assuming that a sufficiently high voltage counteracting the voltage of the current source arises simultaneously in the circuit, for example due to induction.

Figure 4:
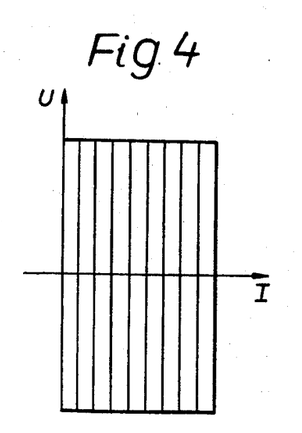
FIG. 4 shows the working range for a controlled current rectifier in collaboration with an alternating current source.

A controlled current rectifier in cooperation with a current source having alternating voltage thus has a working range which can be illustrated graphicly as shown in FIG. 4, where U designates voltage and I current On comparing FIG. 4 with FIGS. 1, 2 and 3, it is seen that FIG. 3 conforms with FIG. 4, which means that the reluctance motor, and only this type of motor, has those properties required in order to attain almost unlimited flexibility in operation with the simple converter equipment described above.

A driving system according to the invention is characterized in that the driving means is intended for a power of at least 0.5 kW and comprises a controlled semiconductor converter connected between a network and the motor winding, and being part of a closed control circuit, said semiconductor converter delivering a pulsing direct current, a current-comparison device being included in said control circuit and a winding current transducer connected to the comparison device, and a switching device controlled by pulses and arranged as reference value emitter, to change from a first to a second and higher current reference value, and vice versa, and a position-responsive device arranged to give switching signals to said switching device with a time interval corresponding to half of said rotor turning movement, wherein said semiconductor converter, in a manner known per se, is arranged to operate with constant current direction and alternating power direction in the winding, power being returned to the network in the time interval when the magnetic flux linked with the winding is reduced by reduction of said permeance.

A driving system according to the invention has, in comparison with similar allround driving systems having semiconductor rectifiers in combination with one or more rotating machines, the advantage that the required power can be supplied to the motor by a much simpler and cheaper rectifier equipment. It might be feared that the tendency towards price reduction, which is obtained since the number of semiconductor components is unusually low, would to a great extent be offset by the relatively high brutto power needed by the reluctance motor because of its well-know low efficiency. However, experiments have shown that not only is it possible with a driving system according to the invention to fulfil all reasonable control requirements with an unusually low number of semiconductor rectifiers, but also that the method of operation used gives the reluctance motor an efficiency at least as great as that of a corresponding asynchronous machine. The high efficiency may to a great extent be put down to the fact that power generated in the motor during intervals of generator effect (normally in intervals with decreasing permeance between rotor and stator) is fed back to the current source with the help of the semiconductor device which is part of the driving system.

It has been found that the degree of utilization of the motor according to the invention is at least as high as an asynchronous motor of conventional design, and since the constructional design is hardly complicated it is possible even for very high motor power, for example 1000 kW, to manufacture the motor at a price which is below that of conventional machines.

DESCRIPTION OF THE PREFERRED EMBODIMENTS

In the following the invention will be described with reference to FIGS. 5 – 10 of the drawings.

Figure 5:
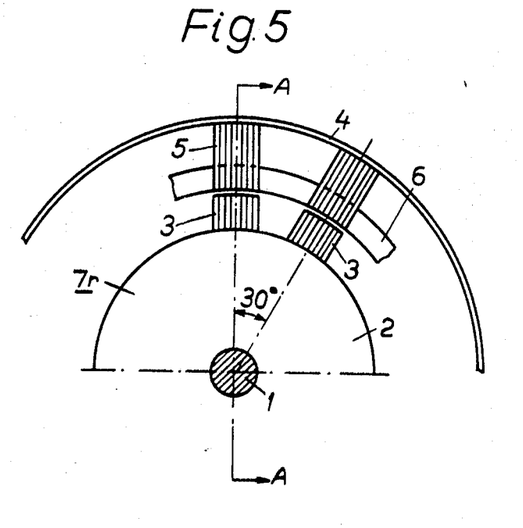
FIG. 5 is a sectional view through a reluctance motor perpendicularly to the shaft.
Figure 6:
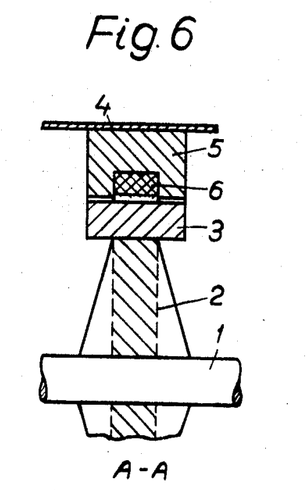
FIG. 6 is a sectional view along the line A—A in FIG. 5.

In FIGS. 5 and 6, 1 designates the rotor shaft, 2 a pole-holder attached on the rotor shaft, which holder may be of steel or non-magnetic material, and which has a plurality of rotor poles 3 uniformly distributed in tangential direction, the pole gaps between having an average width of about 40 percent of the average pole distribution. Only two poles are shown in the drawing. A rigid stator casing 4 supports a plurality of yoke-shaped stator poles 5 which are arranged with the same distribution as the rotor poles. When a stator pole 5 and a rotor pole 3 are opposite each other, as in the drawing, they form together a complete magnetic circuit. The circuit then has its maximum value and this decreases as the rotor turns to a minimum value which is obtained when a rotor pole is between two stator poles. Contrary to what is usual in, for example, DC machines and synchronous machines, the pole width is not greater at the airgap than at other pole parts. When a stator pole and a rotor pole start to overlap local saturation tends always to occur near the overlapping poles surfaces even at a relatively low rate of ampere turns. With the above design of the poles, shown in the drawing, it is ensured that, even when there is considerable overlapping, saturation occurring in the overlapping zone can always occur at a stator ampere turn which is less than that required for saturation of the majority of the pole. The advantage is thus gained that an extremely uniform increase in permeance is obtained while the rotor is turning from zero to 100 percent overlap. The motor is provided with only one winding, the stator winding 6, which is annular with tangential turns and is arranged to partly be surrounded by each stator pole.

Figure 5A:
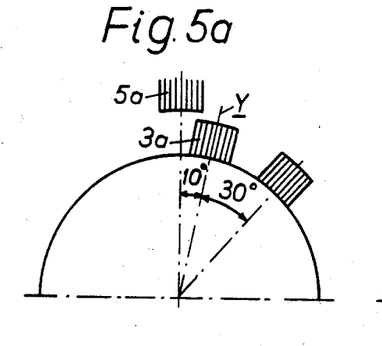
FIG. 5a shows the orientation of the rotor in the phase Y motor unit.
Figure 5B:
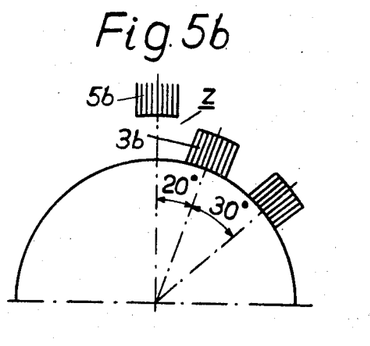
FIG. 5b shows the same for phase Z.
Figure 6A:
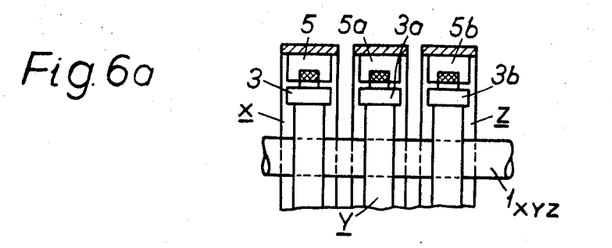
FIG. 6a shows a view of a reluctance motor comprising three motor units according to FIGS. 5 and 6.

With the object of achieving uniform and smooth running and ensuring starting at all angles, a motor may preferably be used which is composed of a plurality of units of the same construction as that shown in FIGS. 5 and 6. A machine constructed from the unit motors X, Y, Z is shown in FIG. 6a. The stators of the three identical motor units have exactly the same angle in relation to the common shaft $1_{XYZ}$. An axial plane A—A through the center of the shaft and the middle of the pole of the stator pole 5 also runs centrally through the stator poles 5a and 5b. The three rotors are attached on the shaft $1_{XYZ}$ at different angles as shown in FIGS. 5, 5a and 5b. When the rotor shown in FIG. 5 has one rotor pole exactly below the stator pole 5, the motor Y has one rotor pole in such a position that its central plane is displaced 10° in relation to the axial plane A—A and the motor Z has a corresponding displacement of 20°. All the rotors have a pole pitch of 30°.

The stator of a motor unit does not necessarily have to be shaped as shown in FIGS. 5 and 6. In principle, a stator may even be used having north and south poles arranged alternatively in tangential direction and each provided with a field winding, the stator winding then consisting of a plurality of coils connected together. Instead of several stator bodies, a single stator ring may be used having a plurality of phase windings, the number of these being equal to the number of stator bodies in the first alternative. For example a motor according to FIG. 3 in U.S. Pat. No. 3,062,979 may be used if opposite coils are connected to constitute phase windings. In this case there would be two phase windings.

Figure 7:
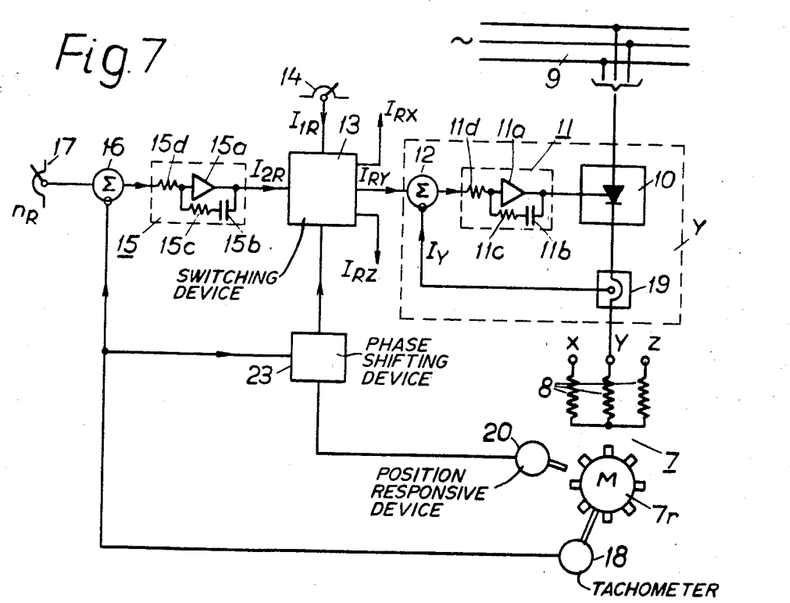
FIG. 7 shows an embodiment of a driving system according to the invention.
Figure 7A:
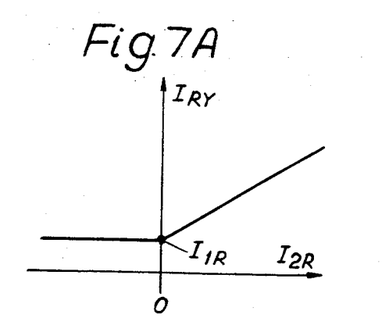
FIG. 7A shows the output signal of the switching device in pull-in position and in dependence on the output signal of the speed regulator unit 15.
Figure 7B:
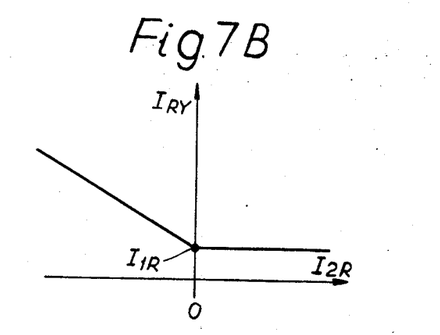
FIG. 7B shows the same in draw-out position.
Figure 8:
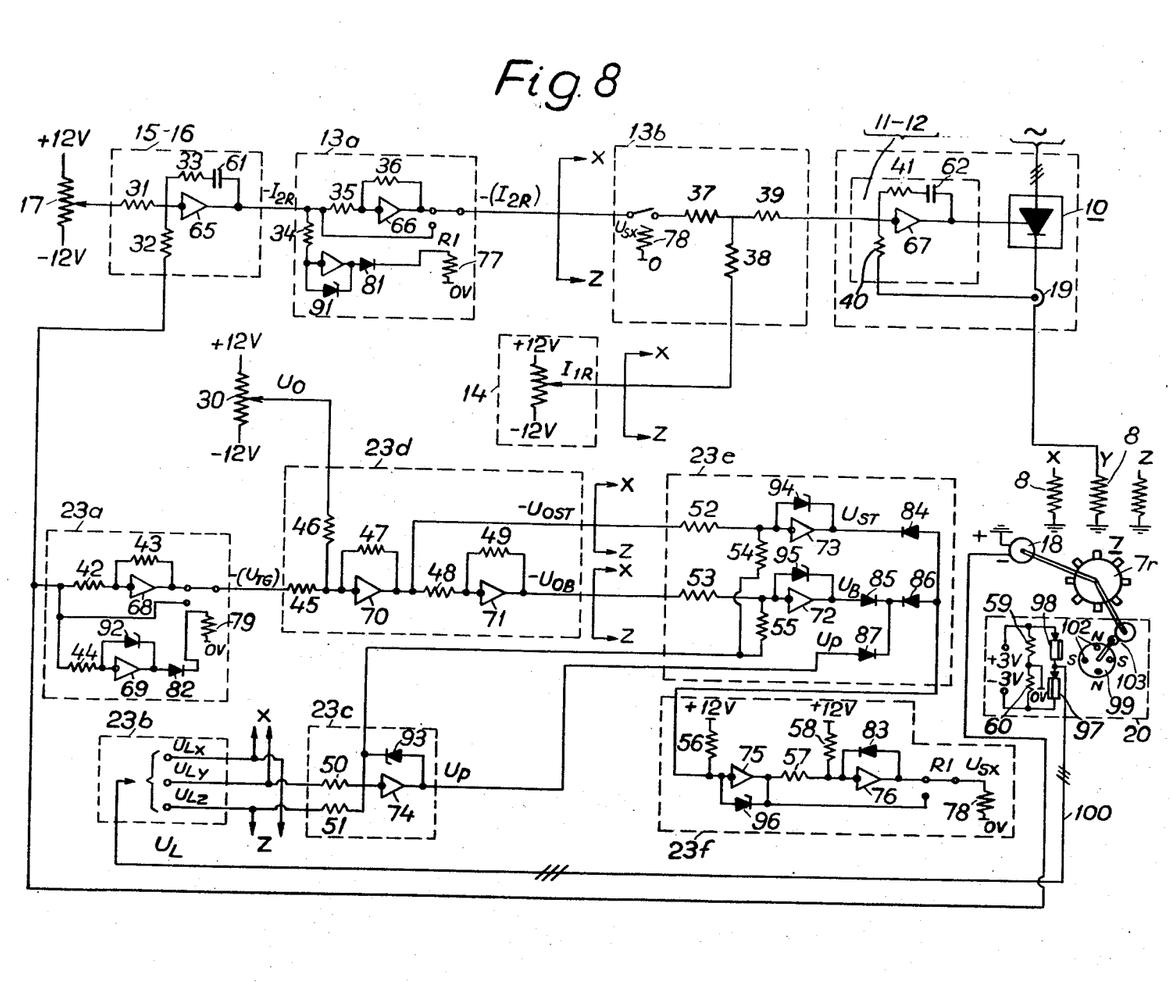
FIG. 8 is a detailed diagram of the connections with reference to FIG. 7 and it shows the internal connection of the devices which in FIG. 7 is indicated as blocks or circles.

The embodiment of the invention shown in FIG. 8 concerns a system comprising a motor of a similar type to that shown in FIG. 6a, i.e., a motor which is composed of three motor units. All the motor windings are shown and the symbolically indicated rotor should be considered as comprising three rotor units attached on the same shaft. For the sake of simplicity only the poles of one of the rotor units are shown in the rotor symbol. Magnitudes and components corresponding to the various motor units are designated with X, Y and Z, respectively. Thus a closed control circuit particularly belonging to the motor unit y is surrounded by a dotted frame and designated Y. Corresponding and exactly similar control circuits are arranged for the motor units X and Z as well, but these are not shown in the figure. The designations used are as follows:

$I_Y$ = current through winding Y
$I_{RY}$ = current reference for winding Y
$I_{1R}$ = desired current value for a half period with decreasing permeance
$I_{1R} + I_{2R}$ = desired current value for a half period with increasing permeance
$n$ = speed of motor
$n_R$ = desired value for speed In FIG. 7 the reluctance motor is designated 7, its rotor 7r and the stator winding 8. The stator is not otherwise shown. The winding 8 of each motor unit is connected to an AC network 9 via a controlled semiconductor converter 10 which converts the alternating current to DC pulses of constant length. A magnitude proportional to the winding current is taken out from the current transducer 19 and compared in the comparison device 12 with a current reference value, the difference being supplied to the input side of the regulator 11 connected to the control circuit of the converter 10. The regulator 11 consists essentially of an amplifier 11a with feedback through a capacitor 11b and a resistor 11c and a series resistor 11d.

The motor 7 consisting of three motor units is provided with a position responsive means 20 in the form of a device giving signal pulses, through a phase advancing determinator 23 which may be omitted in some cases, to the switching device 13 when the stator and rotor poles are substantially opposite each other and in positions when the rotor poles are substantially between two stator poles. Any convenient position responsive means can be used, for example a rotor driven timer which has a magnetic circuit, the permeance having a value dependent on the rotor position, or a photoelectric device. The switching device 13 has two input circuits for current references, one circuit being connected to a manually adjustable reference value emitter 14 and the other to the output side of a regulator unit 15 similar in construction to the unit 11, its input side being supplied from a comparison device 16 with the difference between the output magnitude of a reference device 17 for setting the desired speed and the output value from a tachometer-generator 18 driven by the motor 7. The phase-advancing determinator 23, which is controlled by the speed, is shown in the drawing connected between the tachometer 20 and the switching device 13. This is particularly advantageous at high speeds.

Assume that the motor in FIG. 7 is standing still and the desired value $n_R$ of the speed is set about half the maximum speed in clockwise rotation when the feeding voltage of the current converter 10 is connected. The output of the speed regulator 15, of known proportional or proportional-integrating type, increases to a maximum corresponding to the maximally obtainable value of the difference $I_{2R}$ between the winding current $I_{max}$ at a half period of increasing permeance and the winding current $I_{1R}$ at decreasing permeance. At least one of the three unit rotors is always in such a position, in the following called "pull-in position", that excitation of the corresponding stator results in a torque operating in clockwise direction. The position responsive device 20 indicates at which moment a unit motor comes into pull-in position and the switching device 13 then emits the current order $I_{1R} + I_{2R} = I_{max}$ as reference value for the corresponding winding current. Motor units which are not in pull-in position are at the same time supplied with a winding current delivered by a corresponding converter, the current being determined by the current reference $I_{1R}$, wherein $I_{1R} < I_{max}$.

A driving torque now arises which, besides balancing the load torque, is able to accelerate the motor. As soon as the next rotor unit comes into pull-in position, its converter receives the current order $I_{max}$ and a motor which leaves the pull-in position (comes into pull-out position), is supplied through its converter with a phase winding current determined by the current order $I_{1R}$.

In stable condition, when the motor has reached the desired speed, the regulator 15 reduces $I_{2R}$ to such a value that the motor torque, which is a direct function of $I_{2R}$, is exactly sufficient to balance the load torque and neither acceleration or retardation takes place.

If the speed of the motor is considerably higher than the desired value $n_R$, which may occur upon a sudden decrease of $n_R$ or even upon a sudden decrease in the load torque, the output signal of the speed regulator 15 will be negative. This is interpreted by the switching device 13 in a manner which is reproduced in FIGS. 7A and 7B where 7A corresponds to pulling in and 7B to drawing out. The current desired value for motor units in pull-in position is $I_{1R}$, whereas for phases in draw-out position a higher value of $I_{1R} + |I_{2R}|$ is obtained. A braking moment is thus created in the motor. The motor retards and when the desired lower speed has been achieved, a new equilibrium is reached as has been described in connection with the start of the motor.

Figure 7C:
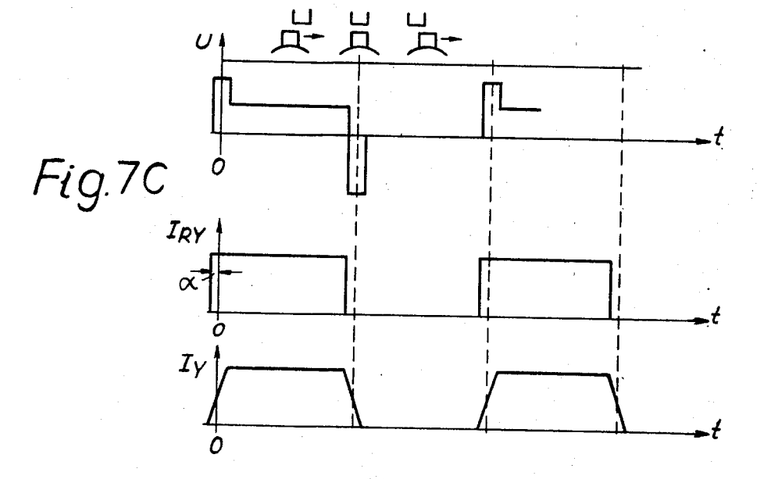
FIG. 7C shows current and voltage progress for a motor unit during driving.
Figure 7D:
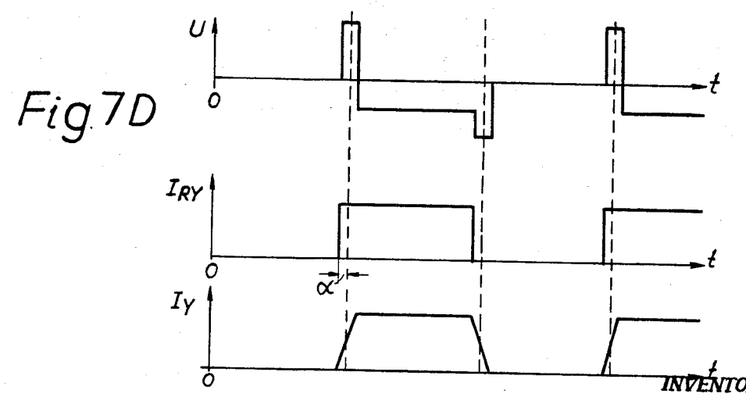
FIG. 7D shows the same during braking.

The current and voltage progress for a motor unit during driving is shown schematically in FIG. 7C and during braking in FIG. 7D. Corresponding rotor positions are suggested at the top of FIG. 7C, and U and I are the phase voltage and phase current, respectively. For the sake of simplicity $I_{1R}$ is assumed to be 0.

At high speeds the delay between current order and current will be a not inconsiderable part of the period and an antecedent current order in relation to the alternation between draw-out and pull-in position (or vice versa) may therefore be advisable. This antecedence is expressed by the phase advance angle α in the drawings 7C and 7D. α is preferably made proportional to the speed of rotation $n$ (see the phase advancing determinator 23 in FIG. 7).

Figure 9:
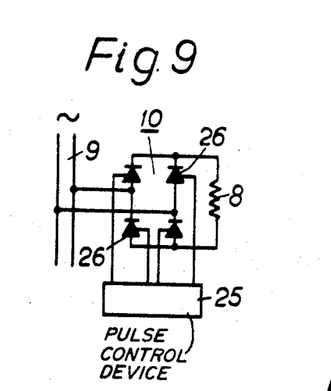
FIG. 9 shows a detailed diagram of the semiconductor 10 of FIG. 7 when the reluctance motor is driven from a one-phase AC network.

The converter 10 shown in FIG. 7 is as shown in FIG. 9 where 25 designates a control angle device, known per se, for converting alternating current to DC pulses, and 26 are thyristors.

If the feeding network is a three phase network a converter 10a is used for each motor unit, said converter being in accordance with FIG. 9a where the corresponding control angle device, which is of known design, is designated 25a and the three-phase network 9a.

Figure 10:
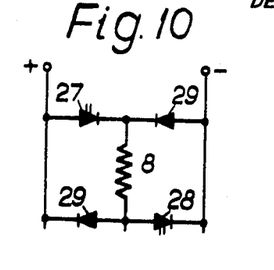
FIG. 10 shows the same applied to a DC network.

If the feeding network is a DC network, the converter equipment shown in FIG. 10 is preferably used where 27 and 28 are so-called "extinguishable thyristors", i.e., each thyristor is provided with a control terminal for ignition and also one for extinguishing. The device also includes two diodes 29.

At driving and maximum motor speed, the thyristor 27 is controlled in such a way that it is continuously conducting when the rotor is in pull in position, whereas in draw-out position the winding current is reduced to a low value by a number of connections and disconnections carried out by the thyristor 28, usually in such a way that the blocking periods of this are considerably longer than the conducting periods. At every current interruption in the thyristor 28, the current continues to flow through the winding 8 since an electromotoric force is induced in this, partly because of self-induction and partly because of permeance decrease, and this current is fed by means of the diode 29 into the network. If $I_{1R} = 0$ (in a similar manner as shown in FIGS. 7C and 7D) is desired, the thyristor 28 is controlled in such a way that it is blocking during the entire drawing-out period. The desired value $I_{2R}$ determines the length of the conducting intervals of the thyristor 27 during a pull in period.

FIG. 8 shows a detailed diagram of connection with reference to FIG. 7 and it shows the internal connection of the devices which in FIG. 7 are indicated as blocks or circles. The comparison device 16 in FIG. 7 is in FIG. 8 included in the regulator unit and therein denoted by the two resistors 31 and 32. The switching device 13 in FIG. 7 is in FIG. 8 divided into two parts 13a and 13b from which 13b contains a switching contact for feeding the output signal IRY to the regulator 11. The converter 10 is explained in detail in FIGS. 9, 9A and 10. The comparison device 12 of FIG. 7 is included in the regulator 11 and denoted 11–12 in FIG. 8.

The phase shifting device 23 is inserted between the position responsive device 20 and the switching device 13 in order to define the angle α shown in FIGS. 7C and 7D. In order to have a somewhat better survey, the device is divided up in a number of parts in FIG. 8, such as 23 a–f. All these parts are most evident to a person skilled in the art and can be carried out in a number of ways, and therefore it seems unnecessary to describe this specific performance. By means of a potentiometer 30 the phase shifting device 23 can be adjusted to give a desired relation between motor speed and the angle α, shown in FIGS. 7C and 7D. The devices 23a, 23b, 23c, 23d, 23e and 23f together constitute the device 23 of FIG. 7. By means of a potentiometer 30 the phase advancing determinator 23 can be adjusted to give a desired dependency between motor speed and the phase advance angle α shown in the drawings 7C and 7D. The reference numbers 31 – 60 designate resistors, the numbers 61 – 62 capacitors and the numbers 65 – 76 amplifiers. The reference numbers 77, 78, 79 designate three different relays, the number 78 being used in two different place for one and the same relay in order to simplify the drawing. The timing device 20 is shown as a device known per se including a pair of magnetodiodes for each of the winding phases, that is for each of the three rotor units 7r. The connection line 100 has three conductors, each connected to a corresponding pair of magnetodiodes, but only one of these connections is shown in the drawing. The three pairs of magnetodiodes are arranged so near a rotating disc 99 that their conductivities are determined by its position, the disc being furnished with permanent magnet poles and mechanically connected to the rotor 7r by a gear transmission 103 giving the disc a higher number of revolutions than that of the rotor 7r. The numbers 91 – 96 designate zenerdiodes.

I claim:

1.
A. Driving system intended for a power of at least 0.5 kW and comprising a reluctance motor, the stator (4) of which has a number of stator pole bodies arranged circumferentially one after the other and supporting a stator winding (6) and the rotor (7) of which has a plurality of rotor poles arranged circumferentially one after the other with a constant pole pitch, the permeance between a rotor pole and the stator always having its maximum value when the rotor pole is substantially opposite a stator pole;
B. speed measuring means (18) for furnishing a signal representative of the speed of said rotor;
C. a rotor position responsive pulse device (20);
D. a current source (9);
E. a controllable semiconductor converter (10) with input-, output- and control terminals and having two possible power directions and one current direction only;
F. first connecting means connecting the input terminals of said controllable converter to said current source;
G. current transducing means (19) having input and output terminals;
H. second connecting means including said current transducing means and connecting the output of said controllable converter to the winding of said reluctance motor;
I. a closed control circuit (Y) including said controllable semiconductor converter (10), a current comparison device (12) with terminals for a current reference value (IRY), and a negative feedback connection between said current transducing means (19) and said current comparison device (12);
J. a two-position, pulse-controlled reference value switching means, having an output terminal, a control terminal and first and second input terminals, the magnitude of the input value of said first input terminal determining the output value during one control pulse, and the said second input terminal determining the output value during the next control pulse;
K. a first electrical circuit connecting the control terminal of said switching means with said rotor position responsive pulse device (20);
L. a first reference value transmitter (17) for supplying a motor speed reference value;
M. a speed comparison device (16) connected to the output of said first reference value transmitter (17) and the output of said speed measuring means (18) for furnishing an output signal representing the difference therebetween;
N. a second electrical circuit (15) connecting the output of said speed-comparison device (16) to said first input terminal of the switching means (13);
O. a second reference value transmitter (14) connected to the second input terminal of the switching means;
P. said rotor-position responsive pulse device (20) including means to supply two pulses at each passage of a rotor pole in relation to a stator pole, one of said pulses being emitted half a rotor pole-pitch in advance and the other pulse half a rotor pole-pitch after the occurrence of said maximum value of the permeance.

2. Driving system according to claim 1, in which the output terminal of said rotor position responsive pulse device (20) is connected to the control terminals of said switching means (13) through a phase-advancing determinator (23), having a control terminal connected with an output terminal of said speed measuring means (18).

* * * * *